United States Patent [19]

Nagasu et al.

[11] 4,321,578
[45] Mar. 23, 1982

[54] PRESSURE TRANSDUCER

[75] Inventors: Akira Nagasu; Yosimi Yamamoto, both of Nakamachi; Takeo Nagata, Hitachi; Hiroyasu Uchida; Yutaka Sakurai, both of Katsuta, all of Japan

[73] Assignee: Hitachi, Ltd., Tokyo, Japan

[21] Appl. No.: 81,372

[22] Filed: Oct. 3, 1979

[30] Foreign Application Priority Data

Oct. 6, 1978 [JP] Japan .................................. 53-122576

[51] Int. Cl.³ .......................................... H01L 10/10
[52] U.S. Cl. ...................................... 338/42; 73/721; 338/4
[58] Field of Search ............... 338/4, 42; 73/719, 720, 73/725, 726, 715

[56] References Cited

U.S. PATENT DOCUMENTS

| | | | |
|---|---|---|---|
| 2,841,984 | 7/1958 | Green | 73/715 X |
| 2,920,299 | 1/1960 | Lent | 73/726 X |
| 3,242,448 | 3/1966 | Paine et al. | 338/42 X |
| 3,335,381 | 8/1967 | DiGiovanni | 338/42 X |
| 3,444,736 | 5/1969 | Stedman | 338/4 X |
| 3,712,143 | 1/1973 | Weaver et al. | 73/720 |
| 3,956,920 | 5/1976 | Kollmeyer | 338/42 X |
| 4,006,640 | 2/1977 | Gealt | 73/720 X |
| 4,019,388 | 4/1977 | Hall et al. | 338/4 X |
| 4,034,610 | 7/1977 | Biddle et al. | 338/42 X |
| 4,056,980 | 11/1977 | Chateau | 338/42 X |
| 4,102,210 | 7/1978 | Couston et al. | 338/42 X |
| 4,111,056 | 9/1978 | Mastromatteo | 73/715 X |
| 4,135,408 | 1/1979 | DiGiovanni | 338/42 X |
| 4,172,387 | 10/1979 | Ezekiel et al. | 338/42 X |
| 4,172,388 | 10/1979 | Gabrielson | 338/42 X |

Primary Examiner—C. L. Albritton
Attorney, Agent, or Firm—Craig and Antonelli

[57] ABSTRACT

A pressure transducer is arranged to mount a semiconductor pressure sensor in a housing such that the pressure of a high-pressure fluid is applied to one side of the semiconductor pressure sensor through a high pressure seal diaphragm and a sealed liquid in the high pressure side, while the pressure of a low-pressure fluid is applied to the other side of the sensor through a low-pressure seal diaphragm and a sealed liquid in the low pressure side, and a protecting member is provided closer to the low-pressure seal diaphragm.

6 Claims, 5 Drawing Figures

PRESSURE TRANSDUCER

The present invention relates to a pressure transducer for detecting a pressure to be measured with a semiconductor pressure sensor and in more particular to a pressure transducer capable of preventing the fluid under measurement from flowing outside of the transducer even if the semiconductor pressure sensor is broken.

In general, in a pressure transducer using a semiconductor pressure sensor which is formed by diffusing given impurities into a diaphragm mainly composed of silicon, the pressure difference between a high pressure fluid and a low pressure fluid is detected by applying to one side of the semiconductor pressure sensor the presure of the high-pressure fluid through a high-pressure seal diaphgram and a sealed liquid in the high pressure side and to the other side of the sensor the pressure of the low-pressure fluid through a low-pressure seal diaphram and a sealed liquid in the low pressure side.

Since the semiconductor pressure sensor is made of a diaphragm of silicon which is usually not mechanically strong, the semiconductor pressure sensor may be broken by an overload condition on the high pressure side of the sensor which often causes the pressure of the high-pressure fluid to exceed the maximum allowable pressure which the semiconductor pressure sensor can withstand. Moreover, it is actually the case that the high pressure seal diaphragm is located closer to the semiconductor pressure sensor by the necessity of making the amounts of the sealed liquid in the high pressure side and that of the low-pressure side equal and small thereby to reduce the effects of ambient temperature change.

Thus, if the semiconductor pressure sensor is broken, the pressure difference will cause the high-pressure side sealed liquid to move toward the low-pressure side thereby urging together with the low-pressure side sealed liquid against the low-pressure seal diaphragm. At this time the high-pressure seal diaphragm and the low-pressure seal diaphragm may be moved resulting in destruction of the high-pressure diaphragm because it is urged against the broken semiconductor pressure sensor and/or a printed circuit substrate laid around it. Consequently, the low-pressure diaphragm is then also destroyed to allow the high-pressure fluid flow outwards. This is a very serious problem when the high-pressure fluid is poisonous or corrosive and in particular the low-pressure side is open to the atmosphere.

In order to solve such problems, it has been proposed to provide an overload protective valve as disclosed in U.S. Pat. No. 3,712,143 issued Jan. 23, 1973 to John A. Weaver et al. entitled "Differential Pressure Responsive Apparatus". But it has disadvantages of making the structure complicated and the amount of the sealed liquid large.

Accordingly, an object of the invention is to provide a pressure transducer in which, even when a semiconductor pressure sensor is destroyed, the low-pressure seal diaphragm is protected from being destroyed thereby preventing the high-pressure fluid from flowing outwards.

In a pressure transducer according to the invention, a semiconductor pressure sensor is mounted in a housing such that the pressure of a high-pressure fluid is applied to one side of the semiconductor pressure sensor through a high-pressure seal diaphragm and a high-pressure side sealed liquid while the pressure of a low-pressure fluid is applied to the other side of the sensor through a low-pressure seal diaphragm and a low-pressure side sealed liquid and a protecting member is provided closer to the low-pressure seal diaphragm.

Other objects and features of the invention will be apparent from the following description taken in connection with the accompanying drawings, in which.

Figure 1:
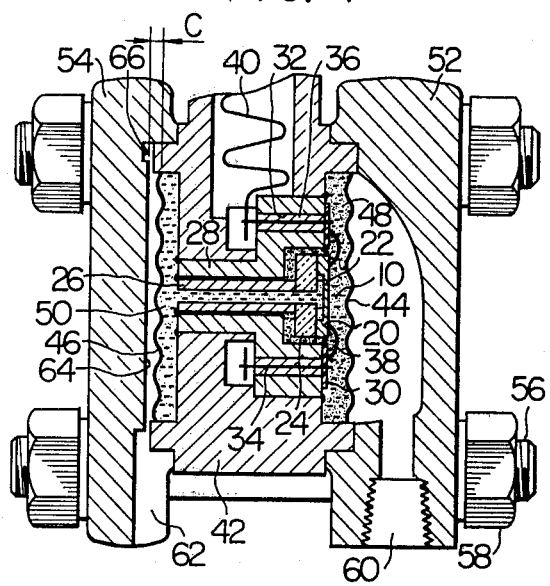
FIG. 1 shows a longitudinal cross sectional view of a pressure transducer according to the invention.

FIG. 1 shows a pressure transducer using a semiconductor pressure sensor 20 which is made of a concaved single crystal of silicon and having a Wheatstone resistor bridge 22 formed in its thin wall part by diffusion technique. the semiconducor pressure sensor 20 is seated on an annular glass washer 24 supported by a metallic hollow cylindrical retainer 26 in such a way that the sensor protrudes into a pressure sensing chamber 10 as sustained by a retainer block 28 made of stainless steel. The glass washer 24 and the metallic hollow cylindrical retainer 26 are made of material having almost the same thermal expansion coefficient as that of silicon. The thermal expansion coefficient of the glass washer 24 is also selected to be close to that of silicon. Preferably, the glass washer 24 is made of borosilicate glass and the metallic hollow cylindrical retainer 26 is made of iron-nickel alloy or iron-nickel-cobalt alloy. The joint between the semiconductor pressure sensor 20 and the glass washer 24 and the joint between the glass washer 24 and the metal hollow cylinder 26 are made by the anodic bonding technique. The metallic hollow cylindrical retainer 26 and the retainer block 28 are joined by arc welding. On a retainer block 28 is mounted a printed circuit substrate 30 made of an annular ceramic member. The printed circuit substrate is located to be substantially flush with the semiconductor pressure sensor 20 and fixed to the retainer block 28 by soldering to conductors 34 which pass through a plurality of through-holes 32 formed axially along the circumferential peripheral portion of the retainer block 28. The conductors 34 are retained by a hermetic seal 36 filled in the through-holes 32. Conductors 38 are provided to connect the printed circuit substrate with the bridge resistor 22 to the semiconductor pressure sensor 20. The conductors 34 retained by the hermetic seal 36 are connected to an external lead wire 40. The retainer block 28 is welded to a housing 42 having a generally cylindrical configuration and made of stainless steel. A high-pressure seal diaphragm 44 and a low-pressure seal diaphragm 46 made of such as stainless steel and Hastelloy are fixed to the housing 42 by means of welding. High-pressure side sealed liquid 48 is filled in a space between a high-pressure seal diaphragm 44 and one side of the semiconductor pressure sensor 20 and low-pressure side sealed liquid 50 is filled in a space between the low-pressure seal diaphragm 46 and the other side of the semiconductor pressure sensor 20. Thus, the high-pressure side sealed liquid 48 and the low-pressure sealed liquid 50 are separated from each other by the semiconductor pressure sensor 20. An incompressible insulating liquid such as silicon oil is used for the sealed liquid. Further, the amount of the high-pressure side sealed liquid 48 and that of the low-pressure side sealed liquid are substantially equal and as small as possible in consideration of minimizing the effects of the temperature changes.

On the two opposite sides of the housing 42 are provided high-pressure side flanges 52 and low-pressure side flange 54 which are each formed into a generally cylindrical configuration having a recess to cover the high-pressure seal diaphragm 44 and the low-pressure seal diaphragm 46, respectively. The flanges are fixed together with the housing by bolts 56 and nuts 58 at the four corners thereof. The high-pressure side flange 52 is provided with an opening 60 leading to the recess as a path to let in high-pressure fluid and the low-pressure side flange 54 is provided with an opening 62 leading to its recess as a path connecting the recess to the external atmosphere. On the internal wall of the low-pressure side flange 54 facing the low-pressure seal diaphragm 46 is provided a circular protuberant flat part 64 having a diameter slightly greater than that of the low-pressure seal diaphragm 46. The flat part 64 is located closer to the low-pressure seal diaphragm 46. Thus, an annular groove 66 is formed almost along the circumferential periphery of the circular protuberant flat part 64 in the space defined by the housing 42, the low-pressure side flange 54 and the circular protuberant flat part 64. A distance C between the circular protuberant flat part 64 and the low-pressure seal diaphragm 46 is so selected that, when the low-pressure seal diaphragm 46 is deformed toward the circular protuberant flat part 64, the entire surface of the low-pressure seal diaphragm 46 comes in contact with the surface of the circular protuberant flat part 64.

When a high-pressure fluid such as a process fluid is led in through the path 60 of the high-pressure side flange 52, the pressure of the high-pressure fluid is applied to one side of the semiconductor pressure sensor 20 through the high-pressure seal diaphragm 44 and the high-pressure side sealed liquid 48. The pressure of the low-pressure fluid is applied to the other side of the semiconductor pressure sensor 20 through the low-pressure seal diaphragm 46 and the low-pressure side sealed liquid 50. As a result, the thin wall part of the semiconducor pressure sensor 20 is distorted toward the low-pressure side in proportion to the pressure difference between them thereby changing the resistance of the bridge resistor 22. A change in the resistance is taken externally through the conductor 38, the printed circuit substrate 30, and the conductors 34 and 40 to indicate the pressure difference.

Figure 2A:
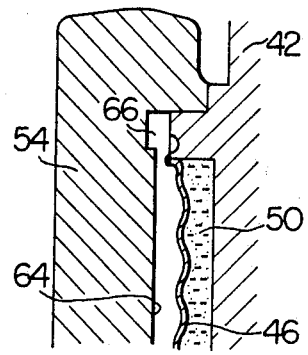
FIGS. 2A and 2B show the normal and abnormal conditions of a low-pressure seal diaphragm and a protective member, respectively.
Figure 2B:
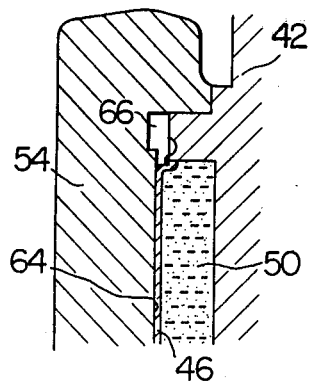

In the event of an overload condition on the high-pressure side, the pressure of the high-pressure fluid may become abnormally high. This abnormally high pressure is transmitted to the semiconductor pressure sensor 20 through the high-pressure seal diaphragm 44 and the high-pressure side sealed liquid 48. If the pressure difference between the high-pressure fluid and the low-pressure fluid exceeds the maximum allowable pressure which the thin wall part of the semiconductor pressure sensor 20 can withstand, the semiconductor pressure sensor 20 will be broken. And then, the high-pressure seal diaphragm 44 and the lower-pressure seal diaphragm 46 are moved toward the low-pressure side or leftward in FIG. 1. Thus, the high-pressure seal diaphragm 44 is urged against the broken semiconductor pressure sensor 20 or the printed circuit substrate 30, and may be broken. This results in futher leftward movement of the low-pressure seal diaphragm 46 until it comes in contact with the circular protuberant flat part 64. That is, the low-pressure seal diaphragm 46 is changed from the state shown in FIG. 2A to the state shown in FIG. 2B where the low-pressure seal diaphragm 46 is held with its almost entire surface being in contact with the circular protuberant flat part 64. Thus, the pressure of the high-pressure fluid is received by the circular protuberant flat part 64 thereby preventing the low-pressure seal diaphragm 46 from being broken. It should be noted that the low-pressure fluid retained between the low-pressure side flange 54 and the low-pressure seal diaphragm 46 flows out through the annular groove 66 and the path 62 leading to the external atmosphere on the low-pressure side. Thus, the groove 66 is effective to prevent an abnormally high pressure which otherwise would be produced by the low-pressure fluid confined between the low-pressure side flange 54 and the low-pressure seal diaphragm 46.

The distance C between the low-pressure seal diaphragm 46 and the circular protuberant flat part 64 is selected depending on the thickness, diameter, mechanical properties as well as the material of the low-pressure seal diaphragm 46. It is preferable that the distance between them is so small that no excessive distortion or the like exist in the low-pressure seal diaphragm 46 when almost the entire surface of the low-pressure seal diaphragm 46 is in contact with the circular protuberant flat part 64. As an example, the distance C is selected to be 0.5 mm when the low-pressure seal diaphragm 46 is made of stainless steel of 0.5 mm in thickness and 42 mm in diameter.

Figure 3A:
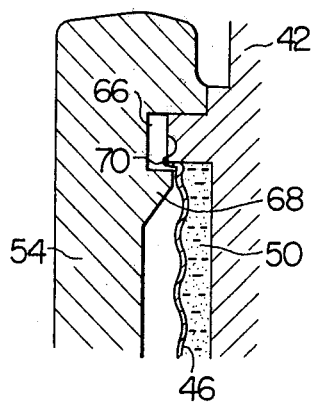
FIGS. 3A and 3B show the normal and abnormal conditions of the low-pressure diaphragm and the protective member, respectively, in another embodiment.
Figure 3B:
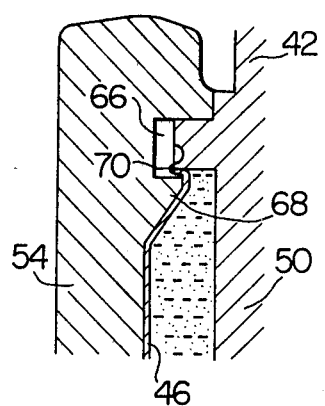

Another embodiment of the invention will be explained with reference to FIGS. 3A and 3B. In this embodiment, an annular ridge 68 with a diameter slightly smaller than that of the low-pressure seal diaphragm 46 is provided on the internal wall of the low-pressure side flange 54 instead of the circular protuberant flat part 64 in FIG. 1. In the same way as in the case of FIGS. 2A and 2B, when the low-pressure seal diaphragm 46 moves toward the low-pressure side flange 54, almost the entire surface of the low-pressure seal diaphragm 46 comes in contact with the annular ridge 68 and the low-pressure side flange 54. In this embodiment, the welded part 70 of the low-pressure seal diaphragm 46 to the housing 42 is not turned back as shown in FIG. 3B, unlike to the embodiment of FIGS. 2A and 2B, so that good sealing effects against higher pressure can be expected as compared with the embodiment of FIGS. 2A and 2B.

As described above, the present invention is capable of preventing any outward flow of high-pressure fluid even if the semiconductor pressure sensor is broken.

What is claimed is:

1. A pressure transducer comprising:
a housing;
a semiconductor pressure sensor mounted in said housing;
high-pressure side and low-pressure side flanges fixed to said housing so as to define a high-pressure side space between said high-pressure side flange and one surface of said sensor and a low-pressure side space between said low-pressure side flange and the opposite surface of said sensor, respectively;
a high-pressure seal diaphragm provided in said high-pressure side space to divide said space into a first space to which said one surface of said sensor is exposed and a second space in which a high-pressure fluid is introduced;
a high-pressure side sealed liquid filled in said first space;

means for mounting said high-pressure seal diaphragm such that said high-pressure sealed liquid receives a pressure substantially the same as the pressure of said high-pressure fluid introduced into said second space through said high-pressure seal diaphragm at least until said pressure of said high-pressure fluid exceeds a pressure value at which said semiconductor pressure sensor may be broken;

a low-pressure seal diaphragm provided in said low-pressure side space to separate it into a third space to which said opposite surface of said sensor is exposed and a fourth space in which atmosphere is introduced;

a low-pressure side sealed liquid filled in said third space; and a protective member provided in said fourth space and disposed to be normally spaced from said low-pressure seal diaphragm by an amount equal to the maximum permissible deflection of said low-pressure seal diaphragm in response to a high pressure so as to protect said low-pressure seal diaphragm against the force of said high-pressure fluid when said sensor and said high-pressure seal diaphragm are accidentally destroyed by the pressure applied thereto.

2. A pressure transducer comprising:

a housing defining a pressure measuring chamber which is opened at each of opposing sides of said housing;

a hollow retaining member mounted in said pressure measuring chamber and having a hollow portion extending between said opposing sides of said housing;

a semiconducor pressure sensor mounted to said retaining member so as to cover one end of said hollow portion, a high-pressure seal diaphragm mounted to said housing to define a closed first space to which one surface of said sensor is exposed;

a high-pressure side sealed liquid filled in said first space;

a high-pressure flange fixed to said housing so as to define a second space separated from said first space by said high-pressure seal diaphragm and having a passage for introducing a high pressure fluid into said second space;

means for mounting said high-pressure seal diaphragm such that said high-pressure sealed liquid receives a pressure substantially the same as the pressure of said high-pressure fluid introduced into said second space through said high-pressure seal diaphragm at least until said pressure of said high-pressure fluid exceeds a pressure value at which said semiconductor pressure sensor may be broken;

a low-pressure seal diaphragm mounted to said housing to define a closed third space to which the other surface of said sensor is exposed;

a low-pressure side sealed liquid filled in said third space;

a low-pressure flange fixed to said housing so as to define a fourth space separated from said third space by said low-pressure seal diaphragm and having a passage for introducing atmosphere into said fourth space;

a protective member provided in said fourth space and disposed to be normally spaced from said low-pressure seal diaphragm by an amount equal to the maximum permissible deflection of said low-pressure seal diaphragm in response to a high pressure so as to protect said low-pressure seal diaphragm against the force of said high-pressure fluid when said sensor and said high-pressure seal diaphragm are accidentally destroyed by the pressure applied thereto.

3. A pressure transducer according to claim 1, in which said protective member is a disc like protuberant member formed on a surface of said low-pressure flange facing said low-pressure seal diaphragm and having a diameter slightly larger than that of said low pressure seal diaphragm.

4. A pressure transducer according to claim 1, wherein said protective member is an annular projection formed on a surface of said low-pressure flange facing said low-pressure seal diaphragm and having a diameter slightly smaller than that of the said low-pressure seal diaphragm.

5. A pressure transducer according to claim 1, wherein said protective member is provided on said low-pressure side flange.

6. A pressure transducer according to claim 2, in which said retaining member includes a first portion made of an iron-nickel alloy and a second portion made of glass and fixed to said first portion, said first portion being bonded to said housing and said second portion being bonded to said semiconducor pressure sensor.

* * * * *